United States Patent
Tull (10) Patent No.: US 7,072,558 B2
(45) Date of Patent: Jul. 4, 2006

(54) SPLICE CHAMBER FOR WIRE LINK TO AN UNDERWATER VEHICLE

(75) Inventor: Michael A. Tull, Waterlooville (GB)

(73) Assignee: BAE Systems plc, London (GB)

( * ) Notice: Subject to any disclaimer, the term of this patent is extended or adjusted under 35 U.S.C. 154(b) by 181 days.

(21) Appl. No.: 10/500,739

(22) PCT Filed: Dec. 19, 2002

(86) PCT No.: PCT/GB02/05789

§ 371 (c)(1),
(2), (4) Date: Jul. 6, 2004

(87) PCT Pub. No.: WO03/057560

PCT Pub. Date: Jul. 17, 2003

(65) Prior Publication Data

US 2005/0084220 A1    Apr. 21, 2005

(30) Foreign Application Priority Data

Jan. 9, 2002    (GB) .................................. 0200354.9

(51) Int. Cl.
*G02B 6/00* (2006.01)
(52) U.S. Cl. ...................................... 385/135; 385/147
(58) Field of Classification Search ...................... None
See application file for complete search history.

(56) References Cited

U.S. PATENT DOCUMENTS

| 4,473,896 | A | * | 9/1984 | Loeser et al. ................ 367/131 |
| 4,632,507 | A | | 12/1986 | Mignien et al. |
| 4,737,010 | A | | 4/1988 | Le Maitre et al. |
| 4,805,979 | A | | 2/1989 | Bossard et al. |
| 4,860,968 | A | * | 8/1989 | Pinson ....................... 244/3.12 |
| 4,974,789 | A | | 12/1990 | Milburn |
| 4,991,793 | A | | 2/1991 | Belsley et al. |
| 5,109,470 | A | * | 4/1992 | Tooze .......................... 385/147 |
| 5,235,932 | A | | 8/1993 | Reich |
| 5,398,636 | A | | 3/1995 | Hillenbrand |
| 5,419,512 | A | | 5/1995 | Holzschuh et al. |
| 5,631,993 | A | | 5/1997 | Cloud et al. |
| 5,787,219 | A | | 7/1998 | Mueller et al. |
| 5,807,026 | A | | 9/1998 | Valette |
| 5,825,963 | A | | 10/1998 | Burgett |

FOREIGN PATENT DOCUMENTS

| DE | 31 18 173 A1 | | 11/1982 |
| FR | 2 654 204 | | 5/1991 |
| FR | 2721157 A1 | * | 12/1995 |
| GB | 2 175 038 | | 11/1986 |
| GB | 2 358 293 A | | 7/2001 |
| WO | 98/15857 | | 4/1998 |

* cited by examiner

*Primary Examiner*—Sung Pak
*Assistant Examiner*—Mike Stahl
(74) *Attorney, Agent, or Firm*—Nixon & Vanderhye P.C.

(57) ABSTRACT

Described herein is a splice chamber for accommodating excess optical cable obtained when making a fusion splice connection between two reels of cable. The chamber comprises two portions which define a space for the optical cable. The chamber is constructed to divide into two longitudinal half portions along a longitudinal line, but each end is retained until conditions are suitable for release. The space inside of the chamber is shaped to determine the bend radius for the enclosed optical cable and protects the cable during storage and handling. When a predetermined force is applied to one end of the chamber, the two longitudinal half portions separate to release the optical cable stored therein, pivoting about the other end.

10 Claims, 7 Drawing Sheets

SPLICE CHAMBER FOR WIRE LINK TO AN UNDERWATER VEHICLE

This application is the US national phase of international application PCT/GB02/05789 filed Dec. 19, 2002, which designated the US and claims priority to GB Application No. 0200354.9 filed 09 Jan. 2002. The entire contents of these applications are incorporated herein by reference.

The present invention relates to improvements in or relating to underwater vehicles.

It is known to use a wire command link to connect an underwater vehicle to its launch platform to provide an exchange of information between the underwater vehicle and the launch platform. The wire command link comprises a copper guide wire which is payed-out from the underwater vehicle as it moves through the water.

The guide wire system consists of two interconnected spools of guide wire, one of which is mounted on the underwater vehicle and the other of which is mounted on the launch platform. The spool of guide wire on the launch platform pays-out through a weighted metal hosepipe which falls, due to gravity, to a position below the launch platform to prevent entanglement of the guide wire with the structure and/or propulsion system of the launch platform. The spool of guide wire on the underwater vehicle unwinds and pays-out from the rear of the underwater vehicle.

Prior to launch of the underwater vehicle, the hosepipe is neatly coiled within a launch tube in the launch platform and is connected by a weak link to the rear of the underwater vehicle which is also located within the launch tube. During the launch phase, the underwater vehicle pulls the hosepipe out of the launch tube until fully deployed, when the weak link separates and the hosepipe falls to a position below the launch platform. The guide wire then pays-out from both spools as the underwater vehicle and the launch platform operate and/or manoeuvre independently.

Whilst copper guide wire is very robust and can be easily jointed and insulated using conventional techniques, there is a move to replace copper guide wire with optical fibres or microcables. Such optical fibres and microcables are, however, quite fragile, and have bend radius limitations. Such optical fibres and cables require a specialised jointing process such as fusion splice techniques.

In fusion splice techniques, lengths of optical fibres or microcables between 0.5 and 1 m are required on each optical fibre or microcable to be available so that the fusion splice technique can be carried out effectively and efficiently. This means that, after the joint has been made, up to 2 m of optical fibre or microcable remains outside the coils of fibre or cable in the underwater vehicle and the launch platform where it is vulnerable to damage due to its fragility.

It is therefore an object of the present invention to provide means for providing storage between the launch platform and the underwater vehicle for the fusion splice joint and any excess fibre or cable. This storage also provides protection for the fusion splice joint during the launch phase.

It is a further object of the present invention to control the bend radius of the optical fibre or microcable to ensure that communication can be maintained between the launch platform and the underwater vehicle and that the fusion splice joint is deployed in a controlled manner during launch of the underwater vehicle.

In accordance with one aspect of the present invention, there is provided a splice chamber for accommodating and protecting a splice and excess optical cable between a launch platform and an underwater vehicle, the chamber comprising:

two half portions joined longitudinally to define a storage chamber;

means for attaching the chamber to the launch platform;

means for attaching the chamber to the underwater vehicle; and means for separating the two half portions of the chamber.

Advantageously, the storage chamber is shaped to control the bend radius of the optical cable stored therein. Moreover, the storage chamber is also shaped to accommodate twists induced into the optical cable during launch of the underwater vehicle from the launch platform.

The means for separating the two half portions of the chamber may comprise an active release device, for example, a spring-loaded device.

The means for attaching the chamber to the launch platform may comprise a hosepipe, the hosepipe being connected to the chamber by a swivel joint. The means for attaching the chamber to the underwater vehicle may include a weak link and/or the active release device. The weak link may comprise a load-sensitive device, for example, a shear pin located in a retaining collar.

For a better understanding of the present invention, reference will now be made, by way of example only, to the accompanying drawings in which.

In accordance with the present invention, the splice chamber comprises a double bellmouth chamber which is split longitudinally into two halves. The splice chamber is mounted between the outboard end of a hosepipe connected to a launch platform and to an underwater vehicle. The radius of the bellmouth determines the bend radius of the enclosed optical fibre or microcable.

The attachment point of the splice chamber to the end of the hosepipe contains a spring loaded device which ejects the two halves of the splice chamber when it is possible to do so. The attachment point to the underwater vehicle holds the two halves of the splice chamber closed and incorporates a load sensitive weak link or shear pin.

During the launch sequence, the underwater vehicle pulls the hosepipe out of the launch tube, the load being applied through the load-sensitive weak link or shear pin until the link or shear pin ruptures.

The splice chamber containing the splice and the excess optical fibre or microcable is released from the underwater vehicle and the two halves of the splice chamber are ejected by the spring and fall clear allowing the optical fibre or microcable guide wire to pay out from both the spool in the launch platform and the spool in the underwater vehicle.

Figure 1:
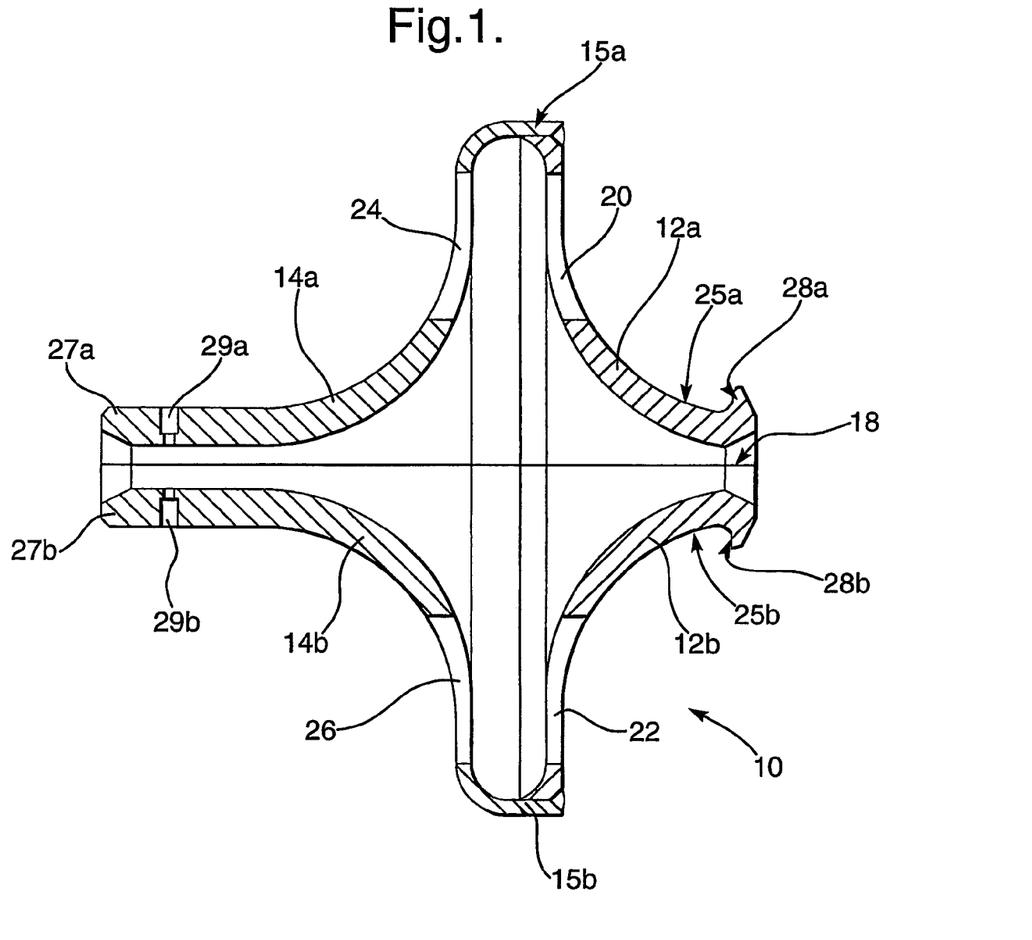
FIG. 1 illustrates a sectioned view through a splice chamber in accordance with the present invention.

Referring initially to FIG. 1, a splice chamber 10 is shown. The chamber 10 comprises two portions 12, 14 which when placed together as shown define a space 16 in which optical fibre or microcable can be stored. The space 16 has a radius such that, when the optical fibre or microcable is inserted, there is no damage thereof due to bend radius limitations causing the optical fibre or microcable to snap or bend excessively.

Furthermore, the inner surfaces of the two portions 12, 14 are shaped such that a minimum bend radius is maintained while the optical fibre or microcable is entering or leaving the storage space 16.

Each portion 12, 14 comprises two half portions 12a, 12b and 14a, 14b respectively. Portions 12a, 12b are joined respectively to portions 14a, 14b at junctions, 15a, 15b in any appropriate way, for example, by welding.

When deployed, the chamber 10 divides in two along longitudinal line 18 to form two identical halves as described below with reference to FIGS. 4 to 8.

Holes 20, 22, 24, 26 may be provided in the chamber 10 to reduce weight if required, for example, if the portions 12, 14 are made of steel or other similar material. Holes 20, 22, 24, 26 also permit visual inspection of the optical fibre or microcable within the chamber 10.

Portion 12 of chamber 10 has a tapered neck portion 25a, 25b which ends in a lip 28a, 28b which extends over both half portions 12a, 12b as shown. Similarly, portion 14 of chamber 10 has a neck portion 27a, 27b in which is formed holes 29a, 29b for receiving a shear pin as described below. It will be understood that the suffices 'a' and 'b' refer to the two half portions of the chamber 10 when divided along longitudinal line 18.

Figure 2:
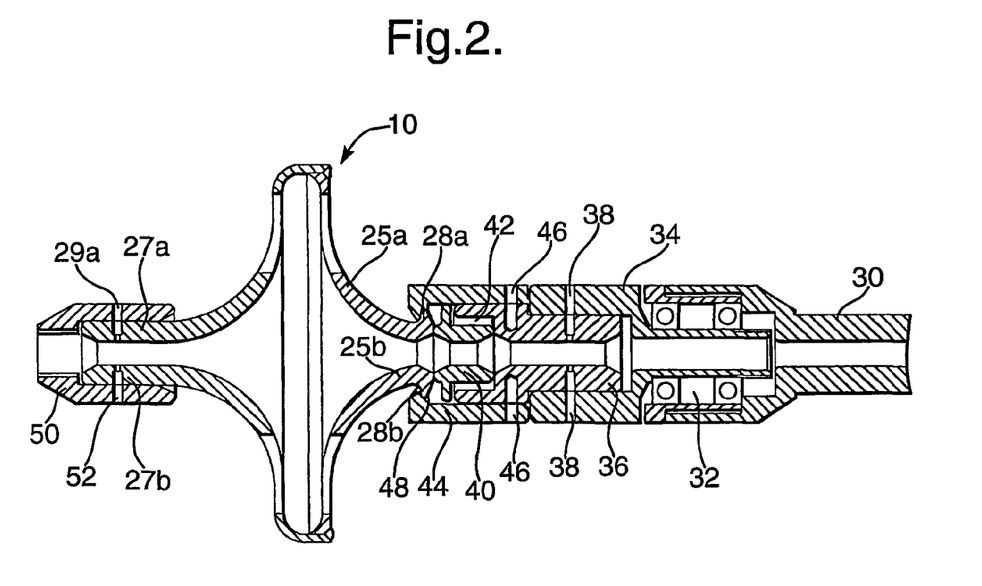
FIG. 2 illustrates a section through the splice chamber of FIG. 1 when connected to a hosepipe in a first embodiment.

FIG. 2 illustrates a splice chamber 10 (shown generally for clarity) connected to a hosepipe 30 at one end and to an underwater vehicle (not shown in detail) at the other end. A swivel joint 32 is provided at the end of the hosepipe 30 to allow relative movement between the splice chamber 10 and the hosepipe 30. A housing 34 is shaped to partially sit within the swivel joint 32 and allows unhindered access for the optical fibre or microcable (not shown). The end of the housing 34 remote from the swivel joint 32 is attached to an inner housing 36 by means of pins or screws 38. Inner housing 36 abuts a member 40 which is biased in position against the action of a spring (not shown for clarity) located in recess 42 formed between inner housing 36 and member 40. An outer housing 44 surrounds member 40 and inner housing 36 and is connected to inner housing 36 by screws or pins 46. Housing 44 has a lip 48 which retains lip 28a, 28b formed neck portion 25a, 25b of the splice chamber 10.

Neck portion 27a, 27b of the splice chamber 10 is connected to a collar 50 via a shear pin 52 located in one of holes 29a, 29b. Also attached to the housing 50 is a ball joint (not shown) which connects to the underwater vehicle (also not shown).

Figure 3:
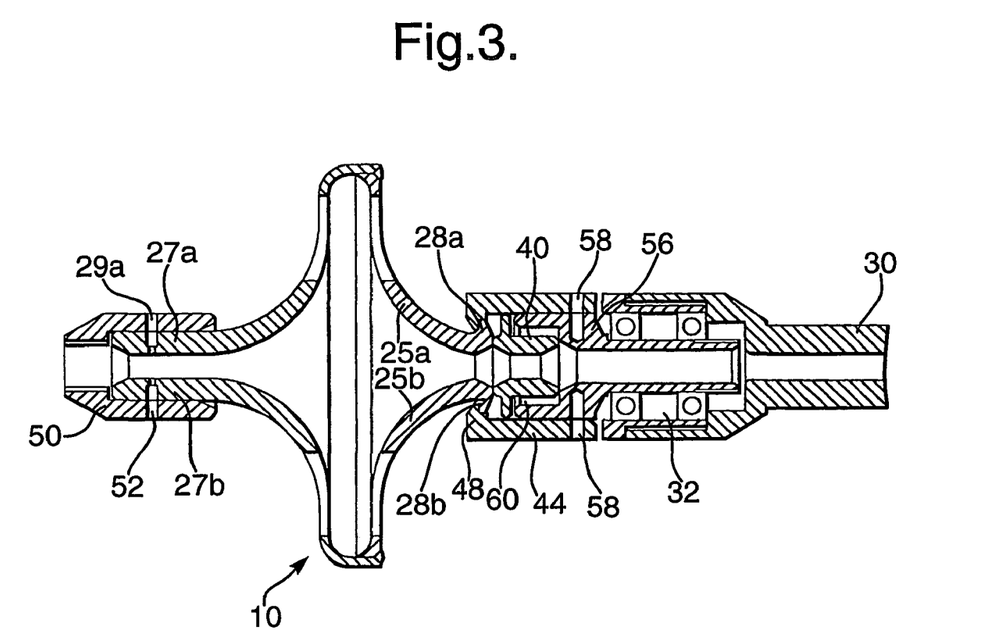
FIG. 3 is similar to FIG. 2 but illustrates the splice chamber connected to a hosepipe in a second embodiment.

FIG. 3 is similar to FIG. 2 and parts which are identical are referenced the same. As before, the splice chamber 10 is connected to a hosepipe 30, via neck portion 25a, 25b and to an underwater vehicle (not shown) at the other end via neck portion 27a, 27b. A swivel joint 32 is provided at the end of the hosepipe 30. The swivel joint 32 surrounds an inner housing 56 which is attached to housing 44 by means of screws or pins 58 and supports member 40 against the action of a spring (not shown for clarity) located in space 60. As before, housing 44 has a lip 48 which engages lip 28a, 28b of neck portion 25a, 25b of splice chamber 10. Neck portion 27a, 27b of the splice chamber 10 is connected to the underwater vehicle (not shown) via collar 50 and shear pin 52 as before.

In both the embodiments of FIGS. 2 and 3, optical fibre or microcable attached to the launch platform (not shown) via the hosepipe 30 passes through housing 34 (FIG. 2) and 56 (FIG. 3), through inner housing 36 (FIG. 2), through member 40 and into the splice chamber 10. Here, the splice and excess optical fibre or microcable left over from the fusion splice operation is stored and protected prior to and during the underwater vehicle deployment. The splice, optical fibre or microcable is wound round the inside of space 16 and then passes through to the underwater vehicle via neck portion 27a, 27b and ball joint (not shown).

Figure 4:
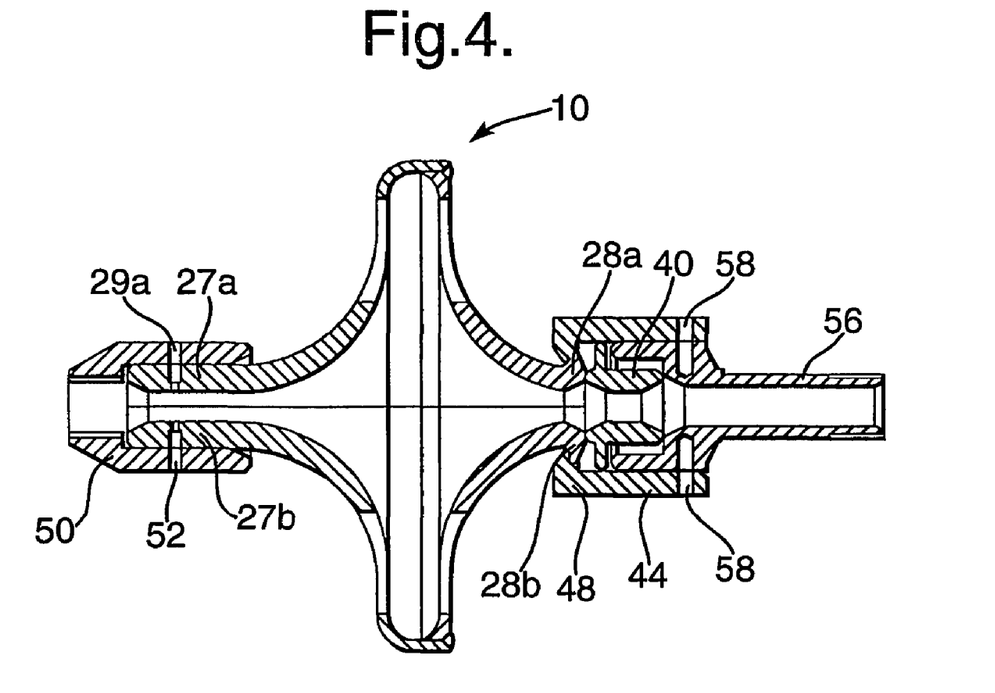
FIGS. 4 to 8 illustrate the stages of deployment of the splice chamber as it releases the stored optical fibre or microcable.
Figure 5:
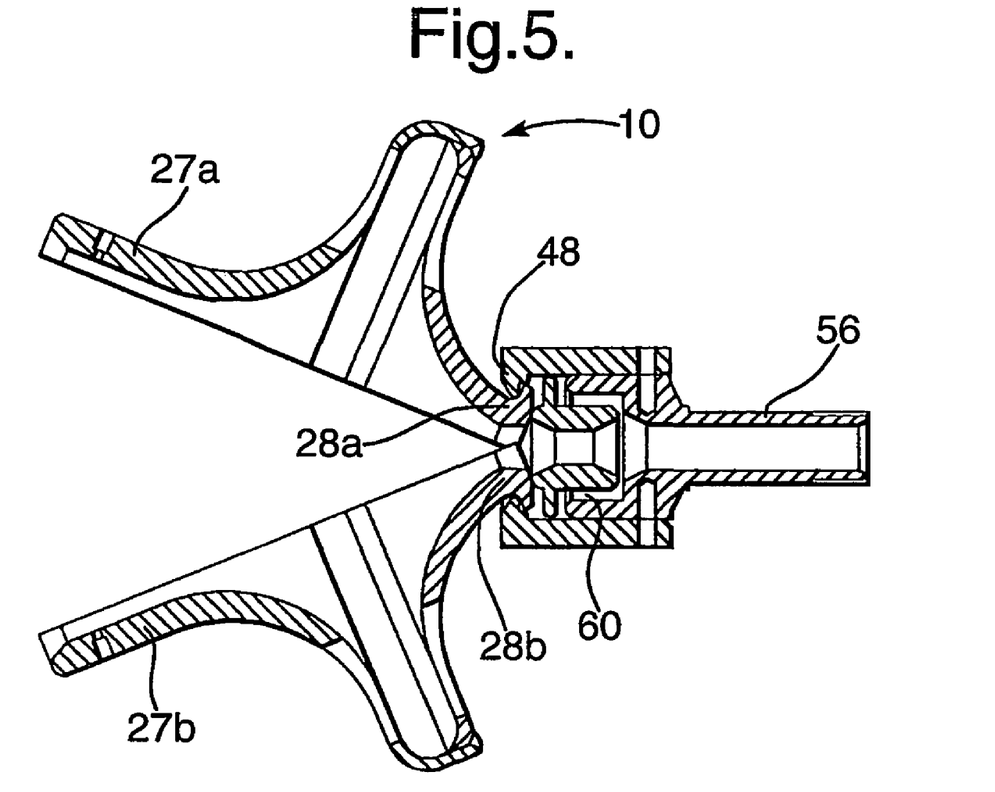
Figure 6:
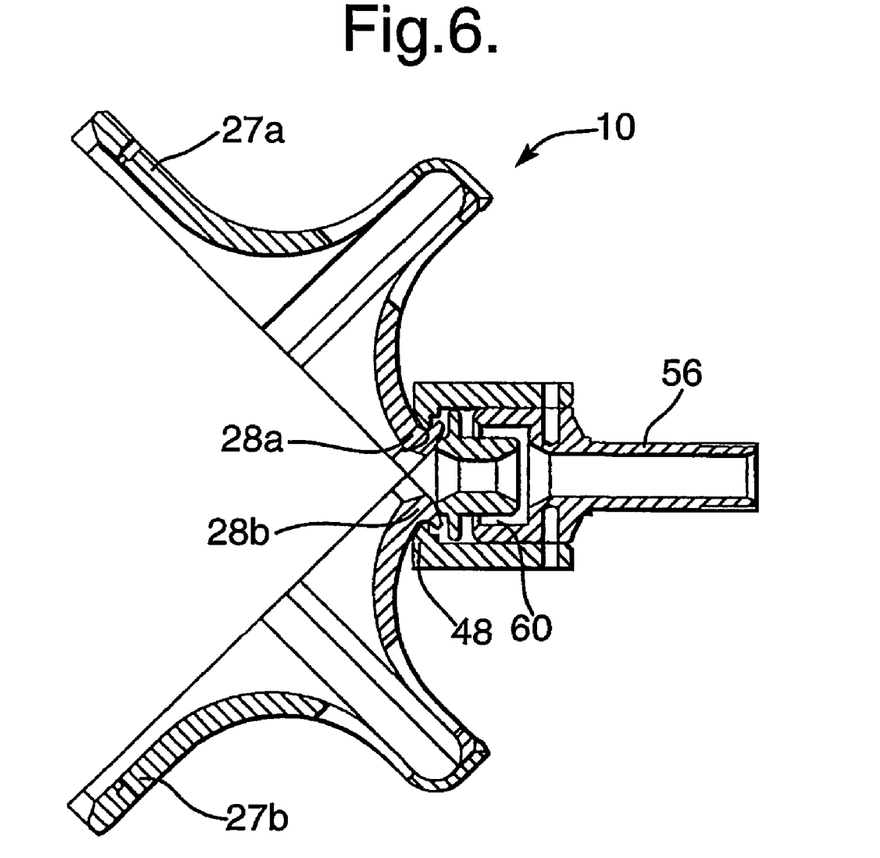
Figure 7:
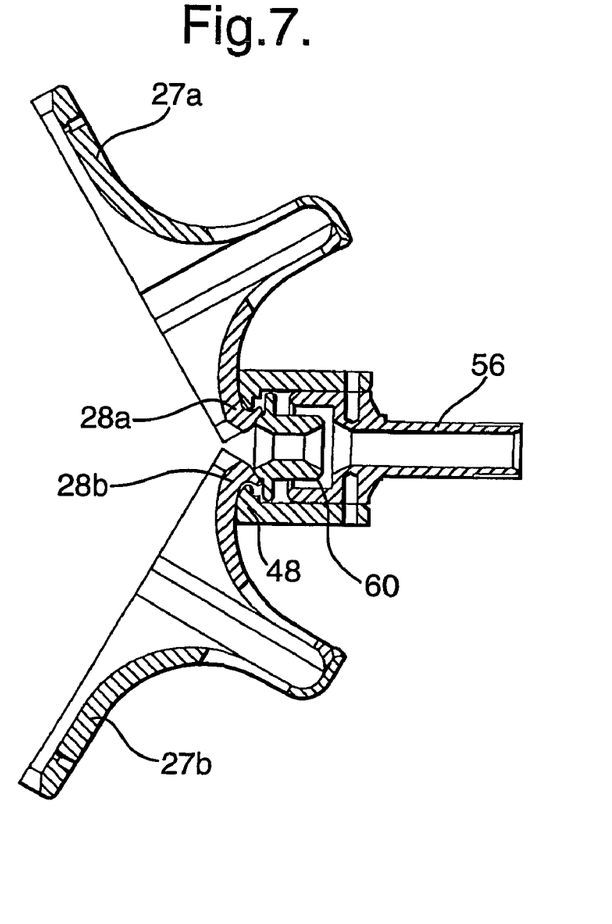
Figure 8:
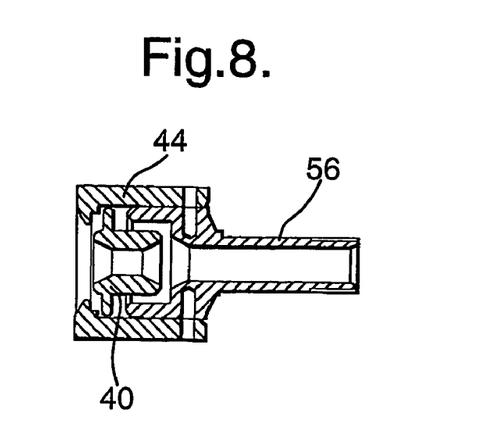

FIGS. 4 to 8 illustrate how the splice chamber 10 is released when it is no longer needed with reference to the FIG. 3 embodiment. In each of FIGS. 4 to 8, the swivel joint 32 and hosepipe 30 are not shown. FIG. 4 illustrates the prior to hose separation position similar to FIG. 3. As the underwater vehicle moves away from its launch platform, the shear pin 52 breaks, when the forces are of the correct magnitude, and releases neck position 27a, 27b of the splice chamber 10 (FIG. 5). It will be appreciated that collar 50 with shear pin 52 retains neck portions 27a, 27b closed, and once the pin 52 breaks, neck portion 27a, 27b is free to open along line 18 (FIG. 1) pivoting at the junction of lip 28a, 28b and lip 48. As the underwater vehicle moves further away (FIG. 6), the two halves of the splice chamber 10 move further outwards due to the action of the spring (not shown) in space 60) until they are almost free (FIG. 7), and then detach from the housing 44 (FIG. 8) leaving the housing 56, housing 44 and member 40 in place.

The invention claimed is:

1. In a wire command link between a launch platform and an underwater vehicle, the wire comprising an optical cable or microcable, a splice chamber through which the wire passes in a longitudinal direction between the launch platform and underwater vehicle, and the splice chamber including:

a storage chamber for accommodating and protecting a splice and excess wire, the storage chamber comprising first and second separable portions, and coupling means both for releasably joining the first and second portions along a line in said longitudinal direction and for releasably coupling the storage chamber between the launch platform and the underwater vehicle, the arrangement being such that in use when the launch platform and underwater vehicle move apart, forces created in said coupling means cause release and separation of the first and second portions to permit deployment in a controlled manner of the splice and excess wire.

2. A splice chamber for use in a wire link between a launch platform and an underwater vehicle, the wire comprising an optical cable or microcable, the splice chamber being such as to permit wire to pass in a longitudinal direction between the launch platform and underwater vehicle, and the splice chamber including:

a storage chamber for accommodating and protecting a splice and excess wire, the storage chamber comprising first and second separable portions, and coupling means both for releasably joining the first and second portions along a line in said longitudinal direction and for releasably coupling the storage chamber between the launch platform and the underwater vehicle, the arrangement being such that in use when the launch platform and underwater vehicle move apart, forces created in said coupling means cause release and separation of the first and second portions to permit deployment in a controlled manner of the splice and excess wire.

3. A chamber according to claim 1, wherein the storage chamber is shaped in generally circular form to control the bend radius of wire stored therein.

4. A chamber according to claim 1, wherein the splice chamber includes first and second neck portions at respective first and second ends of said splice chamber in said longitudinal direction, through which wire passes in use.

5. A chamber according to claim 4, wherein said coupling means includes said second neck portion that is coupled to one end of a tubular housing means, the other end of the tubular housing means being adapted to be connected to a hosepipe.

6. A chamber according to claim 4 wherein said coupling means includes a tubular member that is slidably mounted on the first neck portion and coupled thereto by frangible means.

7. A chamber according to claim 1, wherein the said coupling means includes an active release device for ejecting said first and second portions from the wire therein.

8. A chamber according to claim 7, wherein the active release device comprises a spring-loaded device.

9. A chamber according to claim 1, wherein the coupling means includes a weak link.

10. A chamber according to claim 9, wherein the weak link comprises a shear pin located in a retaining collar.

* * * * *